No. 873,053. PATENTED DEC. 10, 1907.
F. S. KOCH.
ELECTRIC CONDENSER.
APPLICATION FILED JUNE 29, 1904.
2 SHEETS—SHEET 1.
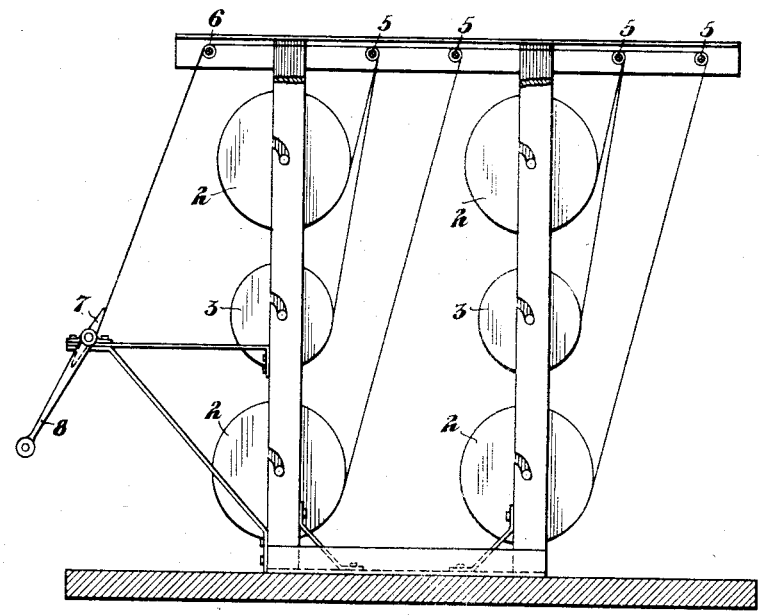
Fig. 1.
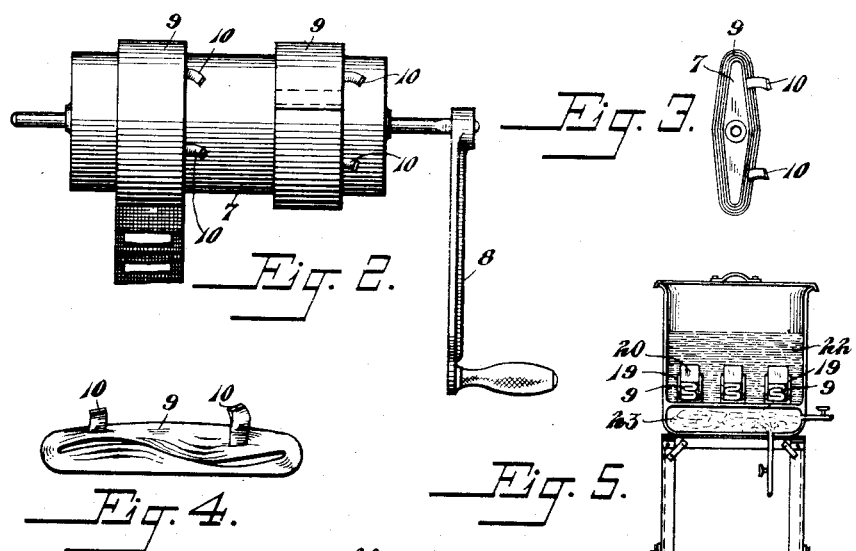
Fig. 2.   Fig. 3.
Fig. 4.   Fig. 5.
Fig. 6.
Witnesses.
Inventor:
Frank S. Koch,
By Robert Lewis Ames,
Attorney.

No. 873,053. PATENTED DEC. 10, 1907.
F. S. KOCH.
ELECTRIC CONDENSER.
APPLICATION FILED JUNE 29, 1904.
2 SHEETS—SHEET 2.
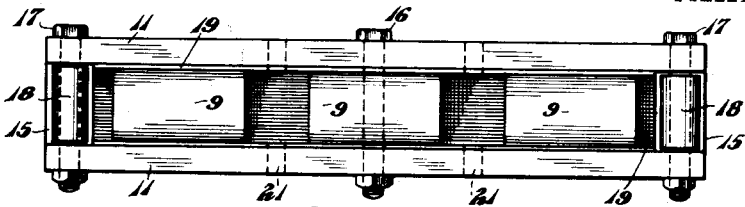
Fig. 7.
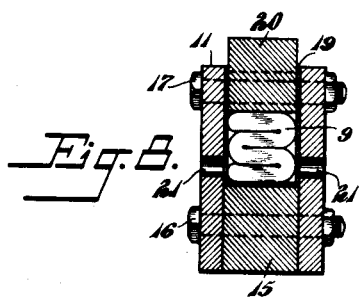
Fig. 8.
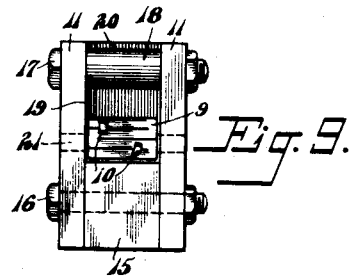
Fig. 9.
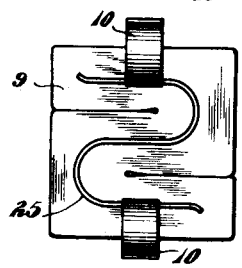
Fig. 11.
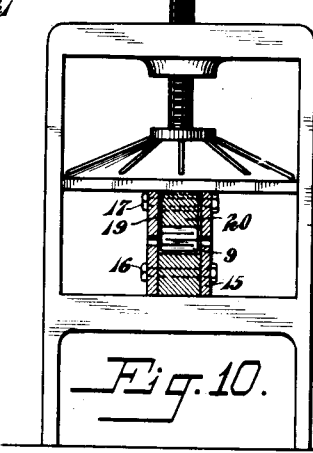
Fig. 10.
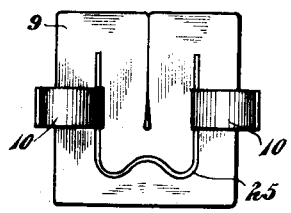
Fig. 12.
Fig. 13.
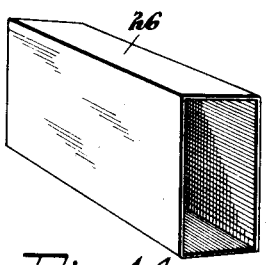
Fig. 14.
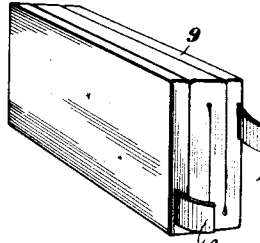
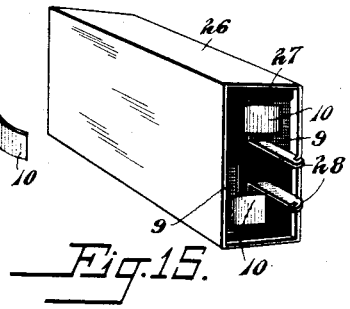
Fig. 15.
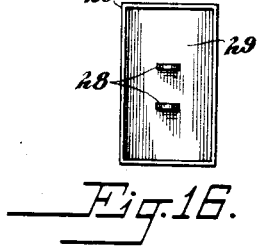
Fig. 16.
Witnesses.
R. H. Bunting
Edith F. Grier
Inventor:
Frank S. Koch,
By Robert Lewis Ames,
Attorney.

UNITED STATES PATENT OFFICE.

FRANK S. KOCH, OF CHICAGO, ILLINOIS, ASSIGNOR TO KELLOGG SWITCHBOARD & SUPPLY COMPANY, OF CHICAGO, ILLINOIS, A CORPORATION OF ILLINOIS.

ELECTRIC CONDENSER.

No. 873,053.  Specification of Letters Patent.  Patented Dec. 10, 1907.

Application filed June 29, 1904. Serial No. 214,605.

*To all whom it may concern:*

Be it known that I, FRANK S. KOCH, a citizen of the United States of America, and resident of Chicago, county of Cook, and State of Illinois, have invented certain new and useful Improvements in Electric Condensers, of which the following is a specification.

My invention relates to improvements in electric condensers, my object being to reduce the size of the condensers per unit capacity, as well as the material and labor involved, thereby not only cheapening their first cost, but also cheapening the cost of shipping and rendering the same more convenient for assembling in telephones or other places.

In carrying out my invention I provide suitable means for rolling the material, consisting of tin foil or other material for the plates and paper forming the dielectric, into oblong or flattened rolls, which rolls are then folded upon themselves into two or more layers and are next subjected to a bath of molten paraffin or other insulating substance, and are later compressed or squeezed in a suitable mold which imparts to the condenser a definite form or shape and which also compresses the sheets or leaves together in such compact form as to bring the plates into close inductive relation at all points. A suitable casing having exterior terminals may then be provided for the condenser to protect the same in use, the said terminals being electrically connected with the plates of the condenser.

My invention is illustrated in the accompanying drawings, in which the same reference characters are used throughout to designate like parts, and in which:

Figure 1 is a side view of the apparatus employed for the initial step in the process, that is, for making the flattened rolls; Fig. 2 is a side view of the form upon which the condensers are wound; Fig. 3 is an end view of the same; Fig. 4 is an end view of the roll after it is taken from the form; Fig. 5 is a view of the paraffin bath to which the condensers are subjected; Fig. 6 is a side view of the mold in which the condensers are compressed; Fig. 7 is a plan view of the mold; Fig. 8 is a cross-section of said mold; Fig. 9 is an end view thereof, and Fig. 10 shows a suitable press in which the molds are placed to form the condensers; Fig. 11 shows an S-shaped condenser after it has been compressed and provided with a suitable core; Fig. 12 shows a similar view of a U-shaped condenser; Fig. 13 is a perspective view of a W-shaped condenser; Fig. 14 shows a suitable casing therefor; Fig. 15 shows the casing after the condenser has been inserted and the top plate applied; and Fig. 16 shows the end of the completed condenser after the casing has been sealed with a suitable composition.

Referring to Fig. 1, suitable rolls 2 of paper or other dielectric of the desired width are rotatably supported upon a frame and between them is located a corresponding roll 3 of tin foil or other desired material to form the plates of the condensers, the width of the foil being a little less than that of the paper as shown in Fig. 2. These strips of paper and tin foil are carried up over the guiding rolls 5 at the upper part of the frame and thence down over a second roll 6 to the winding form 7. Two such sets of rolls are employed since the tin foil from the rolls 3 forms the two plates of the condenser. When the handle 8 of the form 7 is rotated, therefore, the material is drawn off from the said rolls and forms an oblong or flattened roll 9 as shown in Fig. 3, the plates being between two strips of the paper, although but one could be employed, the terminals 10 consisting of thin metal strips, preferably of tinned copper ribbon, being slipped into position in contact with the two strips of tin foil. A good quality of plain rice paper has been found satisfactory for the dielectric. As shown in Fig. 2, one or more rolls 9 may be formed at the same time. Fig. 4 shows the roll after it is removed from the form 7. Other forms of rolls may be used but that shown is preferred.

The mold which I prefer to use in forming the condensers consists of side members or pieces 11 preferably in the form of iron bars or plates of considerable thickness and the bottom piece of block 15, to which said side pieces are bolted by means of the bolts 16. The upper corners of the side members are joined together by the clamping bolts 17 carrying the sleeves 18 between the said side pieces 4. Within this mold is placed a sheet metal trough 19 adapted to fit closely therein and into which the folded rolls 9 are placed, with a block or bar 20 adapted to fit within said trough 19 resting upon them. This trough and mold are made of sufficient length to accommodate a plurality of rolls 9 as shown in Figs. 6 and 7, neither the trough nor the mold being closed at their ends. Suitable apertures 21 are provided in the side members 11 of the mold which coincide with similar apertures in the sides of the trough 19. Although a single mold is shown it is apparent that it may be made wider to form several molds.

After the roll has been formed as in Fig. 4, it is doubled or folded up into two or more layers which may be referred to as U, S, or W form, as indicated in Figs. 12, 11 and 13, respectively. After the rolls are folded up as stated they are placed within the troughs 19 which have been removed from the molds but with the weights 20 resting upon them, and are placed in a bath 22 of molten paraffin or other insulating substance which is maintained at a temperature of from 240 to 260 degrees Fahrenheit and are allowed to remain there for from three to five hours until the rolls are thoroughly impregnated with the paraffin and the moisture and air are driven off. This method of boiling the condensers in paraffin dispenses with the necessity of baking the dry condensers in ovens to drive off the moisture in the layers. This bath is suitably heated by a steam jacket or chamber 23 as indicated in Fig. 5; though of course any method of heating the paraffin may be employed. When thus immersed within the paraffin the open ends of the trough, as well as the apertures in the sides thereof between the condensers, permit the free flow of the liquid in and about the folded rolls.

After the condensers have been placed in the mold the upper bolts 17 are tightened closely against the sides of the trough to press the latter closely against the sides of the bar 20; they are then subjected to heavy pressure in the press 24 shown in Fig. 9 or in any suitable press, and the block 20 is forced down upon the condensers to compress them to the desired amount. In thus compressing the condensers they completely fill the space in the trough of the mold and cause them to assume a rectangular cross-section as indicated in Figs. 11 and 12. The plates of the condenser are thus brought into intimate contact at all points, including the ends of the rolls, and the capacity and insulation of the same are increased. After remaining in the molds under compression for from two to four hours they are sufficiently cool to be removed and are then in the form shown in the various figures. If the molds are taken out of the press 24 before they are cool suitable clamps may be applied to the molds to hold the bars 20 down in position and the molds then removed from the press to make room for others.

In Figs. 11 and 12 I show the condenser provided with a lead or other sheet metal core 25 placed in the roll before it is folded up, or upon which the roll may be wound in place of form 7, and which assists in maintaining the form of the condenser after pressure has been removed. The terminals 10 are slipped into the roll at the proper time at the beginning of the rolling operation, the one in contact with one plate or tin foil strip and the other with the other plate of strip of foil, both of course being out of contact with the metallic core 25.

A suitable casing or box 26 shown in Fig. 13 of tin or other desired material and of about the size of the condenser after it has been compressed, is provided and into which the condenser is adapted to be inserted. A fiber or other insulating plate 27, adapted to fit within the casing and having secured thereto the metallic terminals 28, is then placed in the casing on top of the condenser and the terminals 10 are soldered or otherwise connected to the said terminals 28. When this has been done a suitable filling 29 of insulating wax or composition is filled in above the plate 27 and serves to secure the same within the casing 26. By this process of compressing the condensers in molds, they may be made smaller than in the usual way, the sheets of foil are placed in close inductive relation at the ends of the folds as well as along the sides, and a form convenient for mounting and assembling is imparted thereto.

Having thus described my invention, what I claim and desire to secure by Letters Patent is:—

1. A condenser formed of a folded roll of alternate conducting and non-conducting materials, of a metal core for said condenser adapted to be folded within said roll to maintain the same in its folded position, substantially as described.

2. A condenser formed of a folded roll of conducting and insulating sheets, of a plate about which said sheets are rolled, said plate being bent within the folds of the condenser and adapted to hold the same in its folded position, substantially as described.

3. A condenser consisting of a roll of alternate layers of plates and dielectric folded upon itself to form several layers and impregnated with paraffin or similar insulating material and compressed upon all sides to constitute a homogeneous mass with the plates and dielectric in intimate contact at all points and internal means to prevent the plates and dielectric from separating when the pressure is released.

4. A condenser formed of a flattened roll of alternate layers of plates and dielectric folded upon itself to form a plurality of layers, a metallic core provided for said layers, and the whole compressed upon all sides to form a homogeneous mass with the plates in intimate relation at all points.

5. A condenser formed of alternate sheets of conducting and insulating material, of a core about which said sheets are wound, said core and sheets being adapted to be folded integrally, whereby the rigidity of the core maintains the folded position of the sheets, substantially as described.

Signed by me at Chicago, county of Cook, State of Illinois, in the presence of two witnesses.

FRANK S. KOCH.

Witnesses:
ROBERT LEWIS AMES,
EDITH F. GRIER.